United States Patent
Gottfried et al.

(10) Patent No.: US 6,746,767 B2
(45) Date of Patent: Jun. 8, 2004

(54) SUPERPARAMAGNETIC OXIDIC PARTICLES, PROCESSES FOR THEIR PRODUCTION AND THEIR USE

(75) Inventors: Heiko Gottfried, Schoeneck (DE); Christian Janzen, Duisburg (DE); Markus Pridoehl, Grosskrotzenburg (DE); Paul Roth, Kempen (DE); Berthold Trageser, Freigericht (DE); Guido Zimmermann, Hanau (DE)

(73) Assignee: Degussa AG, Duesseldorf (DE)

( * ) Notice: Subject to any disclaimer, the term of this patent is extended or adjusted under 35 U.S.C. 154(b) by 41 days.

(21) Appl. No.: 10/219,267

(22) Filed: Aug. 16, 2002

(65) Prior Publication Data

US 2003/0059603 A1 Mar. 27, 2003

(30) Foreign Application Priority Data

Aug. 16, 2001 (DE) .......................... 101 40 089

(51) Int. Cl.$^7$ .............. B32B 1/00; H01F 1/36; C01G 49/00
(52) U.S. Cl. ............. 428/402; 428/403; 428/404; 428/900; 137/1
(58) Field of Search ............... 428/402, 900, 428/403, 404; 137/1

(56) References Cited

U.S. PATENT DOCUMENTS

2003/0059603 A1    3/2003   Gottfried et al.

FOREIGN PATENT DOCUMENTS

| DE | 43 07 262 A1 | 9/1994 |
| JP | 10-167731 | 6/1998 |
| WO | WO 01/37291 A1 | 5/2001 |

OTHER PUBLICATIONS

M. R. Zahcariah et al., "Formation of Superparamagnetic Nanocomposites from Vapor Phase Condensation in a Flame," *NanoStructured Materials*, vol. 5, No. 4, pp. 383–392, 1995.

*Primary Examiner*—Monique R. Jackson
(74) *Attorney, Agent, or Firm*—Oblon, Spivak, McClelland, Maier & Neustadt, P.C.

(57) ABSTRACT

Pyrogenic, oxidic particles contain superparamagnetic metal oxide domains with a diameter of 3 to 20 nm in a non-magnetic metal or non-metal oxide matrix. The particles display a chloride content of 50 to 1000 ppm. The particles are produced by pyrogenic processes by mixing the precursor of the superparamagnetic domains and the precursor of the non-magnetic metal or non-metal oxide matrix in a flame with air and/or oxygen and fuel gas and reacting this mixture in a flame. The particles can be used as ferro fluids, for example.

20 Claims, 5 Drawing Sheets

SUPERPARAMAGNETIC OXIDIC PARTICLES, PROCESSES FOR THEIR PRODUCTION AND THEIR USE

BACKGROUND OF THE INVENTION

1. Field of the Invention

The invention concerns pyrogenic, oxidic particles containing superparamagnetic metal oxide domains in a non-magnetic metal oxide or metalloid oxide matrix, processes for their production and their use.

2. Discussion of the Background

Superparamagnetic particles are used in many areas, for example for data stores, as contrast media in imaging processes, in ferro fluids or for biochemical separation and analysis processes.

Superparamagnetic materials have properties that are characteristic for both paramagnetic substances and ferromagnetic materials. Like paramagnetic substances, superparamagnetic substances have no permanent (equiaxed) alignment of the elementary magnetic dipoles in the absence of external magnetic fields. On the other hand they display a similarly high magnetic susceptibility under the influence of an external magnetic field. Furthermore they are characterised by the presence of crystalline structures. Superparamagnetism occurs when the diameter of the crystalline regions in a normally ferromagnetic substance falls below a particular critical value.

The theoretical basis of superparamagnetism lies in the thermal destabilisation of the permanent alignment of the elementary magnetic dipoles in the crystal structure. The thermal energy of the elementary magnetic dipoles inhibits their alignment in the absence of external magnetic fields. Following the removal of an external magnetic field, the individual elementary magnetic dipoles are still present, but they are in such a thermally excited state that they cannot align themselves in a parallel (equiaxed) orientation. Correspondingly the crystals are not permanently magnetic.

Typical superparamagnetic substances are maghemite (gamma-$Fe_2O_3$, $\gamma$-$Fe_2O_3$) and magnetite ($Fe_3O_4$), which display superparamagnetic behaviour below a particle size of approx. 20 nm, depending on the substance and shape.

The superparamagnetic properties of such particles are only retained if the magnetic domains are physically separated. To this end the particles are typically coated with organic compounds and stabilised to prevent aggregation.

Superparamagnetic iron oxide particles for example can be obtained by spray pyrolysis of the iron compounds iron(III) acetyl acetonate, iron(II) ammonium citrate and iron(III) nitrate (T. Gonzáles-Carreño et al., Materials Letter 18 (1993) 151–155) or by a gas phase reaction starting from iron pentacarbonyl or iron acetyl acetonate (S. Barth et al., Journal of Material Science 32 (1997) 1083–1092).

The disadvantage of spray pyrolysis is that the choice of starting materials and of reaction conditions that lead to gamma iron oxide ($\gamma$-$Fe_2O_3$) is limited. If iron(III) chloride is used, ferrimagnetic particles are obtained. Furthermore, alpha iron oxide ($\alpha$-$Fe_2O_3$) and hydroxide phases often appear as impurities.

The choice of iron oxide precursors is equally restricted in the gas phase reaction. Starting materials containing chlorine, sulfur or nitrogen are explicitly excluded since they can lead to the formation of undesirable iron oxide phases, such as e.g. beta iron oxide ($\beta$-$Fe_2O_3$) if iron chloride is used as precursor.

U.S. Pat. No. 5,316,699 describes the production of ultrafine superparamagnetic particles in a dielectric matrix by means of a sol-gel process and the subsequent reducing treatment with hydrogen. The particles obtained display a network of interconnected pores, in which the magnetic component is located. The disadvantage compared with largely pore-free particles of the same surface area is that in applications involving mass transport processes the pores may not be freely accessible.

Also disadvantageous is the lengthy production of the particles, which can last for up to several weeks, and the necessary aftertreatment with hydrogen at uneconomically high temperatures. In addition the particles can contain impurities from the starting materials along with by-products and decomposition products from the other reaction steps.

Zachariah et al. (Nanostruct. Mater. 5, 383, 1995) describe nano-materials consisting of silicon dioxide and superparamagnetic domains from iron oxides obtained by flame oxidation. They start from organic precursors, toxic iron pentacarbonyl and hexamethyl disiloxane. These materials are uneconomic for producing relatively large quantities and there is also the risk that carbon impurities may remain in the particles. Furthermore, only particles with silicon dioxide as non-magnetic component and iron oxides as superparamagnetic component are described.

A further characteristic of superparamagnetic particles is their "blocking temperature". This is the temperature below which any superparamagnetic behaviour ceases to be observed. In particles obtained by the process described, it is 155 K. A further reduction in the "blocking temperature" for special applications, for example in cryogenic engineering, is desirable.

The object was therefore to provide superparamagnetic particles that do not display the disadvantages of the prior art. In particular they should be largely free from impurities, such as carbon and non-superparamagnetic modifications, for example, and display only a low pore volume.

The object of the invention is further to provide a process with which a broad range of superparamagnetic particles can be produced from readily available, inexpensive starting materials.

SUMMARY OF THE INVENTION

The invention provides pyrogenic, oxidic particles with a chloride content of 50 to 1000 ppm, containing superparamagnetic metal oxide domains with a diameter of 3 to 20 nm in a non-magnetic matrix containing a metal oxide or a metalloid oxide. The particles can be produced by pyrogenic processes by mixing the precursor of the superparamagnetic domains and the precursor of the non-magnetic metal or metalloid oxide matrix in a flame with air and/or oxygen and fuel gas and reacting this mixture in a flame.

BRIEF DESCRIPTION OF THE DRAWINGS

The preferred embodiments of the invention will be described in detail with reference to the following figures, wherein.

DETAILED DESCRIPTION OF PREFERRED EMBODIMENTS

The pyrogenic, oxidic particles of the present invention have a chloride content of 50 to 1000 ppm. The chloride content derives from the production of the particles. The particles according to the invention are obtained by means of a pyrogenic process in which chlorine-containing precursors, for example, react in a hydrogen/oxygen flame. The particles that are formed can exhibit chlorine for example in the form of oxychlorides from the only partially completed flame oxidation and in the form of hydrochloric acid. If these compounds are trapped in the particle as it forms, the chloride content of the particles cannot be reduced any further even by purification steps without destroying the particles.

The maximum possible chloride content of the particles according to the invention is up to 1000 ppm. Particles with a chloride content of 100 up to 500 ppm can preferably be obtained by means of purification steps. It can be reduced to values up to 50 ppm by means of further purification steps.

The total chloride content is determined by Wickbold combustion or by digestion with subsequent titration or ion chromatography.

In the context of the present invention chloride stands for a chloride anion ($Cl^-$). This species is determined by Wickbold combustion, titration or ion chromatography. Chlorine stands for chlorine atom(s), e.g., in $SiCl_4$.

The method of producing the particles according to the invention containing chloride, in a pyrogenic process is surprising. Barth et al. (Journal of Material Science 32 (1997) 1083–1092), among others, describe how chloride ions have a directing effect for the formation of the non-superparamagnetic beta iron oxide ($\beta$-$Fe_2O_3$) from iron(III) chloride. Gonzáles-Carreño et al. (Materials Letter 18 (1993) 151–155) showed that no superparamagnetic particles are obtained in the spray pyrolysis of iron(III) chloride in contrast to other precursors.

The particles according to the invention can display varying degrees of aggregation, depending on the way in which the pyrogenic process is conducted. Influencing parameters can be residence time, temperature, pressure, the partial pressures of the compounds used, the type and location of cooling after the reaction. A broad spectrum of largely spherical to largely aggregated particles can thus be obtained.

The domains of the particles according to the invention are understood to be superparamagnetic regions that are physically separated from one another. As a consequence of the pyrogenic process, the particles according to the invention are largely pore-free and display free hydroxyl groups on the surface. They display superparamagnetic properties if an external magnetic field is applied. They are not permanently magnetised, however, and display only a low residual magnetisation.

According to a particular embodiment, the carbon content of the particles according to the invention can be below 500 ppm. The range is particularly preferably below 100 ppm.

The BET surface area, determined according to DIN 66131, of the particles according to the invention can be varied across a broad range from 10 to 600 $m^2/g$. The range from 50 to 300 $m^2/g$ is particularly advantageous.

In a preferred embodiment of the invention, the "blocking temperature" of the particles according to the invention can be no more than 150 K. The blocking temperature is the temperature below which no superparamagnetic behaviour can be detected. This temperature can depend on the size of the superparamagnetic domains and on their anisotropy as well as on the composition of the particle.

The proportion of superparamagnetic domains in the particles according to the invention can be between 1 and 99.6 wt. %. Regions of superparamagnetic domains that are physically separated by the non-magnetic matrix lie within this range. The range having a proportion of superparamagnetic domains greater than 30 wt. %, particularly preferably greater than 50 wt. %, is preferred. Increasing the part of the superparamagnetic regions, also increases the magnetic action of the particles according to the invention.

The superparamagnetic domains can preferably contain the oxides of Fe, Cr, Eu, Y, Sm or Gd. The metal oxides in these domains can be in a uniform modification or in various modifications.

There may also additionally be regions of non-magnetic modifications in the particles. These can be mixed oxides of the non-magnetic matrix with the domains. Iron silicalite ($FeSiO_4$) can serve as an example of these. These non-magnetic components behave in the same way as the non-magnetic matrix with regard to superparamagnetism. This means that the particles are superparamagnetic, but the saturation magnetisation falls as the proportion of non-magnetic components increases.

There can additionally also be magnetic domains that because of their size display no superparamagnetism and induce a remanence. This causes the volume-specific saturation magnetisation to increase. Particles adapted in this way can be produced according to the area of application.

A particularly preferred superparamagnetic domain is iron oxide in the form of gamma-$Fe_2O_3$ ($\gamma$-$Fe_2O_3$), $Fe_3O_4$, mixtures of gamma-$Fe_2O_3$ ($\gamma$-$Fe_2O_3$) and $Fe_3O_4$ and/or mixtures of the above with non-magnetic compounds containing iron.

The non-magnetic matrix can include the oxides of metals and metalloids. Metalloids include As, Po, Sb, P, B, Se, C, Si, Ge and Te. Preferably, the non-magnetic matrix can include the oxides of Si, Al, Ti, Ce, Mg, Zn, B, Zr or Ge. Silicon dioxide, aluminium oxide, titanium dioxide and cerium oxide are particularly preferred. In addition to the physical separation of the superparamagnetic domains, the matrix also has the task of stabilising the level of oxidation of the domain. Thus for example magnetite as a superparamagnetic iron oxide phase is stabilized by a silicon dioxide matrix.

The particles according to the invention can be modified by adsorption, surface reactions or complexation of or with inorganic and organic reagents.

The particles according to the invention can for example acquire a partially or entirely hydrophobed surface by means of a subsequent treatment with surface modifying reagents. The surface modification can be performed in the same way as the processes described in DE-A-11 63 784, DE-A-196 16 781, DE-A-197 57 210 or DE-A-44 02 370, DE-A 42 02 695, DE-A-42 02 694 for silicon dioxide, titanium dioxide and aluminium oxide.

The particles according to the invention can further be partially or entirely coated with a further metal oxide. This can be achieved for example by dispersing the particles according to the invention in a solution containing organometallic compounds. After addition of a hydrolysing catalyst, the organometallic compound is converted to its oxide, which is deposited onto the particles according to the invention. Examples of such organometallic compounds are the alcoholates of silicon ($Si(OR)_4$), aluminium ($Al(OR)_3$) or titanium ($Ti(OR)_4$).

The surface of the particles according to the invention can also be modified by adsorption of bioorganic materials such as nucleic acids or polysaccharides. The modification can be performed in a dispersion containing the bioorganic material and the particles according to the invention.

The invention also provides a process for producing the particles according to in the invention comprising the steps of:

- evaporating, together or separately, a compound containing the metal or metalloid component of the non-magnetic matrix and a compound containing the metal component of the superparamagnetic domain, wherein at least one compound contains chlorine, and wherein the vapor quantities correspond to the ultimately desired ratio of the superparamagnetic domains and the non-magnetic matrix,
- feeding this mixture with the help of a carrier gas to a mixing zone, where it is mixed with air and/or oxygen and a fuel gas and supplying this mixture to a burner of known construction and reacting this mixture in a flame inside a combustion chamber, and
- cooling the hot gases and the solid product, separating the gases from the solid product, and optionally purifying the solid product by heat treatment with gases humidified with water vapour. Hydrogen or methane can preferably be used as fuel gases.

The particles according to the invention can further be obtained by a process comprising the steps of:

- preparing an aerosol by nebulization of an precursor, this precursor containing the metal component of the superparamagnetic domain, in form of an aqueous solution or a suspension of a salt,
- mixing said aerosol with a gas mixture of a flame hydrolysis or flame oxidation containing the precursor of the non-magnetic matrix in a mixing zone, wherein the vapour quantities correspond to the ultimately desired ratio of superparamagnetic domains and non-magnetic matrix,
- supplying the aerosol-gas mixture to a burner of known construction and reacting the mixture in a flame inside a combustion chamber, and
- cooling the hot gases and the solid, separating the gases from the solid, and optionally purifying the product by a heat treatment with gases humidified with water vapour, wherein the precursor of the superparamagnetic domain and/or of the non-magnetic matrix is a chlorine containing compound.

The particles according to the invention can further be obtained by a process comprising the steps of:

- preparing, together or separately, an aerosol by nebulization, containing the precursor of the non-magnetic metal oxide matrix or metaloid oxide matrix and the precursor of the superparamagnetic domain, wherein the precursor is in form of an aqueous solution or a suspension of a salt, and wherein the aerosol quantities correspond to the ultimately desired ratio of the superparamagnetic domains and the non-magnetic matrix,
- feeding said aerosol of the precursors, together or separately, to a mixing zone, where it is mixed with air and/or oxygen and a fuel gas and supplying the mixture to a burner of known construction and reacting this mixture in a flame inside a combustion chamber, and
- cooling the hot gases and solid, separately the gases from the solid, and optionally purifying the solid product by heat treatment with gases humidified with water vapour, wherein wherein the precursor of the superparamagnetic domain and/or the non-magnetic matrix is a chlorine containing compound.

Figure 1:
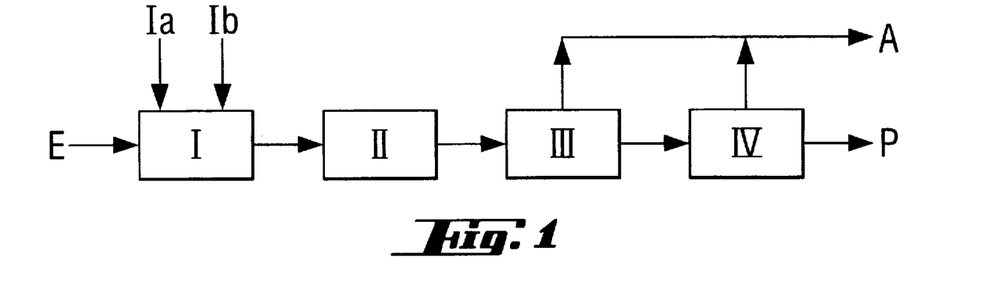
FIGS. 1, 1a, 1b, 1c, 1d and 1e illustrate processes for producing the pyrogenic, oxidic particles of the invention.

FIG. 1 shows a simplified process scheme, including the process steps I to IV, with I=mixing zone, II=burner, III=filter, IV=purification.

The incoming flow Ia into the mixing zone represents air and/or oxygen, Ib represents a fuel gas, E represents the product forming precursors, A represents the off-gas and P the product according to the invention. The mixing zone I can be part of a mixing unit, which is separate from the burner or can be a part of the burner itself. It is preferred that the mixing zone is a part of the burner.

Figure 1A:
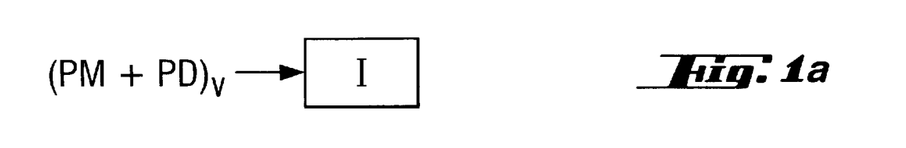

FIGS. 1a–1e show feeding variants of E into the mixing zone I. FIG. 1a shows that the precursors of the matrix PM and the precursors of the domains PD are jointly evaporated (Index v) and supplied to the mixing zone.

Figure 1B:
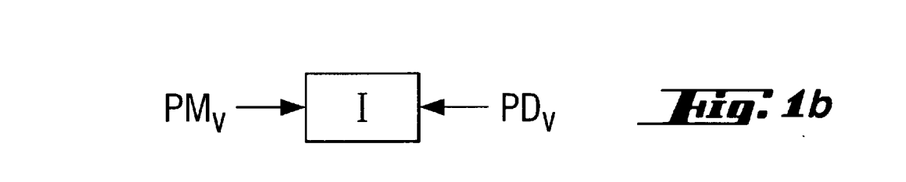
Figure 1C:
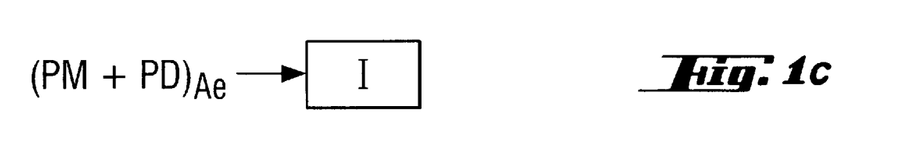

FIG. 1b shows the separate evaporation and feeding of PM and PD. FIG. 1c shows a variant where PM and PD are transformed into an aerosol (index Ae) and jointly fed into the mixing zone I.

Figure 1D:
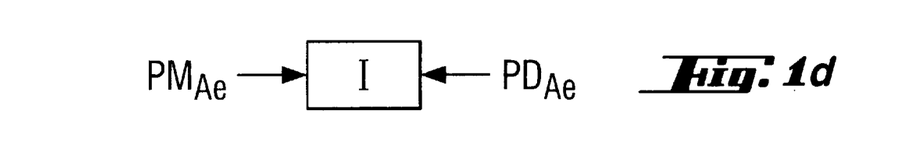
Figure 1E:
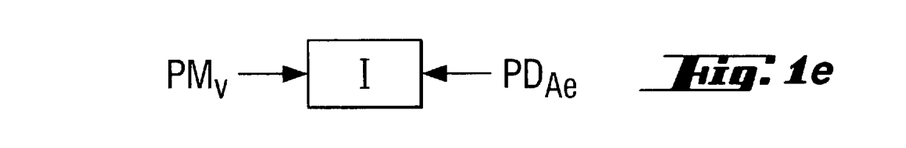

FIG. 1d shows the separate feeding of PM and PD in form of aerosols. FIG. 1e shows a variant where PM is fed into the mixing zone in vaporized form, whereas PD is fed into the mixing zone in the form of an aerosol.

Nebulization can preferably be performed by means of a one-fluid or two-fluid nozzle or by means of an aerosol generator.

In the above processes according to the invention the reaction partners, precursors of the metal oxide or metalloid oxide matrix and of the superparamagnetic domains, can both be inorganic, chlorine-containing salts. Alternatively, only the precursor of the metal oxide or metalloid oxide matrix can contain chlorine, and the precursor of the superparamagnetic domains can be a chlorine-free inorganic salt, such as a nitrate or a chlorine-free organometallic compound, such as iron pentacarbonyl for example. It is also possible for the precursor of the metal oxide or metalloid oxide matrix to be a chlorine-free inorganic salt, such as nitrate or a chlorine-free organometallic compound such as a siloxane and the precursor of the superparamagnetic domains to be a chlorine-containing, inorganic salt. It is particularly preferable for both the precursor of the metal oxide or metalloid oxide matrix and the precursor of the superparamagnetic domains to be chlorine-containing, inorganic salts.

Cooling in all processes according to the invention can preferably be performed by means of a heat exchanger or by direct incorporation of water or a gas, such as air or nitrogen for example, or by adiabatic release of the process gas pressure using a Laval nozzle.

The invention also provides the use of the particles according to the invention for data stores, as contrast media in imaging processes, for biochemical separation and analysis processes, for medical applications such as e.g. drug targeting and contrast media, as an abrasive, as a catalyst or as catalyst support, which because of their superparamagnetism can easily be recovered, as a filler, as a thickener, for thermal insulation, as a dispersing agent, as a flow promoter and in ferro fluids. Ferro fluids are used among other things as sealants for shafts, as a cooling and damping medium in loudspeakers and for a switchable double refraction (Cotton-Moutton effect).

EXAMPLES

Analytical Methods

BET Surface Area

The BET surface area of the particles according to the invention was determined according to DIN 66131.

Content of Silicon Dioxide, Iron Oxide and Cerium Oxide

Approx. 0.3 g of the particles according to the invention are accurately weighed into a platinum crucible and ignited in a crucible at 700° C. for 2 h, cooled in a desiccator and reweighed to determine the loss on ignition. After rinsing the edges with ultra-pure water the sample material is fumed off on a hot plate until dry with 1 ml reagent-grade $H_2SO_4$ 1:1 and at least 3 ml reagent-grade HF 40%. The loss of weight due to fuming off is assumed to be $SiO_2$ and the remainder $Fe_2O_3$.

The content of iron oxide and cerium oxide in example 4 is determined by ICP-OES.

Determining the Chloride Content

Approx. 0.3 g of the particles according to the invention are accurately weighed out, combined with 20 ml of reagent-grade 20% sodium hydroxide solution, dissolved and transferred into 15 ml cooled $HNO_3$ while being stirred. The chloride component in the solution is titrated with $AgNO_3$ solution (0.1 mol/l or 0.01 mol/l).

Determining the Carbon Content

Approx. 100–1000 mg of the particles according to the invention are accurately weighed into a crucible, combined with 1 g of ultra-pure iron and 1 g of aggregate (LECOCELL II) and burned in a carbon analyser (LECO) at approximately 1800° C. with the aid of oxygen. The $CO_2$ that is formed is measured by IR and the content calculated from that measurement.

Blocking Temperature

The magnetic moment of the particles according to the invention is measured against temperature in a SQUID measuring device (Superconducting Quantum Interference Device). To this end a demagnetised sample is cooled to 5 K. In a weak external magnetic field the sample is heated to room temperature and the magnetic moment of the sample measured as it is heated. The corresponding curve is known as a "zero field cooled" (ZFC) curve.

Example 1

Superparamagnetic Iron Oxide in Silicon doxide Matrix 0.14 kg/h $SiCl_4$ are evaporated at approx. 200° C. and introduced into a mixing zone with 3.5 $Nm^3$/h hydrogen and 15 $Nm^3$/h air.

An aerosol obtained from a 10 wt. % aqueous iron(III) chloride solution using a two-fluid nozzle is also introduced into the mixing zone by means of a carrier gas (3 $Nm^3$/h nitrogen).

The homogeneously mixed gas-aerosol mixture flows into the reactor, where it burns at an adiabatic combustion temperature of approximately 1200° C. and for a residence time of approximately 50 msec.

The adiabatic combustion temperature is calculated from the mass and energy balance of the streams of substances entering the reactor. The energy balance takes into account both the reaction enthalpy of the hydrogen combustion and the conversion of silicon tetrachloride to silicon dioxide and of iron(III) chloride to iron(II) oxide and the evaporation of the aqueous solution.

The residence time is calculated from the quotient of the volume of the unit through which the substances flow and the working volumetric flow rate of the process gases at the adiabatic combustion temperature.

Following the flame hydrolysis the reaction gases and the iron oxide-doped silicon dioxide powder obtained are cooled by known means and the solid is separated from the waste gas stream using a filter.

In a further step residual hydrochloric acid still adhering to the powder is removed by treatment with water vapour-containing nitrogen.

Examples 2 and 3 are performed in the same way as Example 1. The reaction parameters can be found in Table 1.

TABLE 1

Reaction parameters for Examples 1 to 4

|  | Example | | | |
| --- | --- | --- | --- | --- |
|  | 1 | 2 | 3 | 4 |
| $SiCl_4$ (kg/h) | 0.14 | 0.23 | 0.21 | — |
| $FeCl_3$(*) (kg/h) | 1.02 | 0.41 | 0.40 | 0.59 |
| $CeCl_3$(**) (kg/h) | — | — | — | 0.41 |
| Adiabatic temp. (° C.) | 1200 | 1250 | 1150 | 1200 |
| Residence time (ms) | approx. 50 | approx. 50 | approx. 50 | approx. 50 |

*10% aqueous $FeCl_3$ solution; $FeCl_2$ in example 3
**10% aqueous $CeCl_3$ solution

Example 4

Superparamagnetic Iron Oxide in Cerium Oxide Matrix 3.5 $Nm^3$/h hydrogen and 15 $Nm^3$/h air are introduced into a mixing zone. An aerosol obtained from a 10 wt. % aqueous iron(III) chloride solution and a 10 wt. % cerium(III) chloride solution using a two-fluid nozzle is also introduced into the mixing zone by means of a carrier gas (3 $Nm^3$/h nitrogen). The homogeneously mixed gas-aerosol mixture flows into the reactor, where it burns. The reaction mixture is processed and purified in the same way as described in Example 1. The reaction parameters are reproduced in Table 1.

Table 2 shows the analytical results for the examples.

TABLE 2

Analytical data for the particles according to the invention from Examples 1 to 4

| | Examples | | | |
|---|---|---|---|---|
| | 1 | 2 | 3 | 4 |
| Iron oxide(*) (wt. %) | 50 | 50 | 25 | 50 |
| C (ppm) | 70 | 53 | 42 | <10 |
| Cl (ppm) | 368 | 220 | 102 | 635 |
| Saturation magnetisation ($Am^2/kg$) | 17 | 6.5 | 10.4 | 12.5 |
| gamma-$Fe_2O_3$ crystallite size (nm) | 10.8 | 11.2 | 11.5 | 15.1 |
| Blocking temperature (K) | approx. 100 | approx. 40 | approx. 110 | n.d.(**) |
| BET surface area ($m^2/g$) | 146 | 174 | 143 | 88 |

*calculated as $Fe_2O_3$;
**n.d. = not determined

TEM Images

Figure 2:
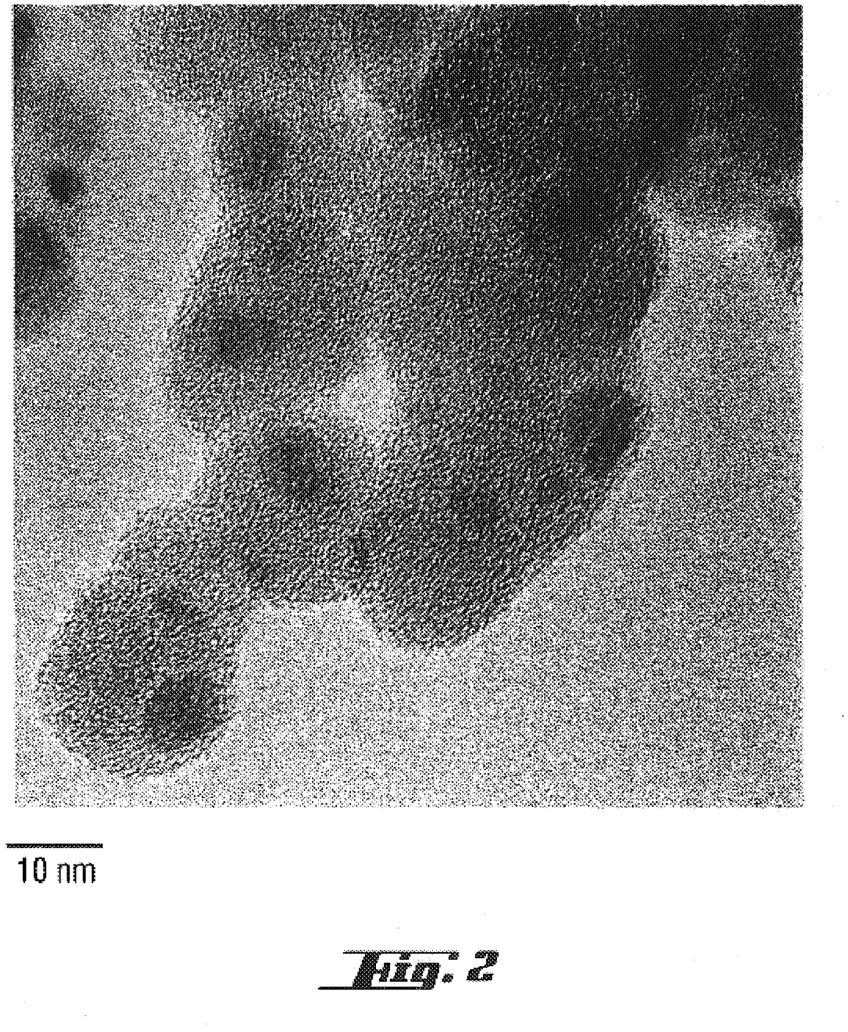
FIG. 2 shows a transmission electron microscope (TEM) image of particles according to the invention from Example 2.

The TEM images of the particles from Examples 1 to 3 show an amorphous silicon dioxide matrix in which iron oxide domains with a crystal size of 5 to 15 nm are embedded. FIG. 2 shows a TEM image of the particles from Example 2. The iron oxide is represented by the dark area. The TEM image of the particles from Example 4 shows a partially amorphous, partially crystalline cerium oxide matrix in which iron oxide domains with a crystal size of 5 to 15 nm are embedded.

X-ray Diffractograms (XRD)

Figure 3:
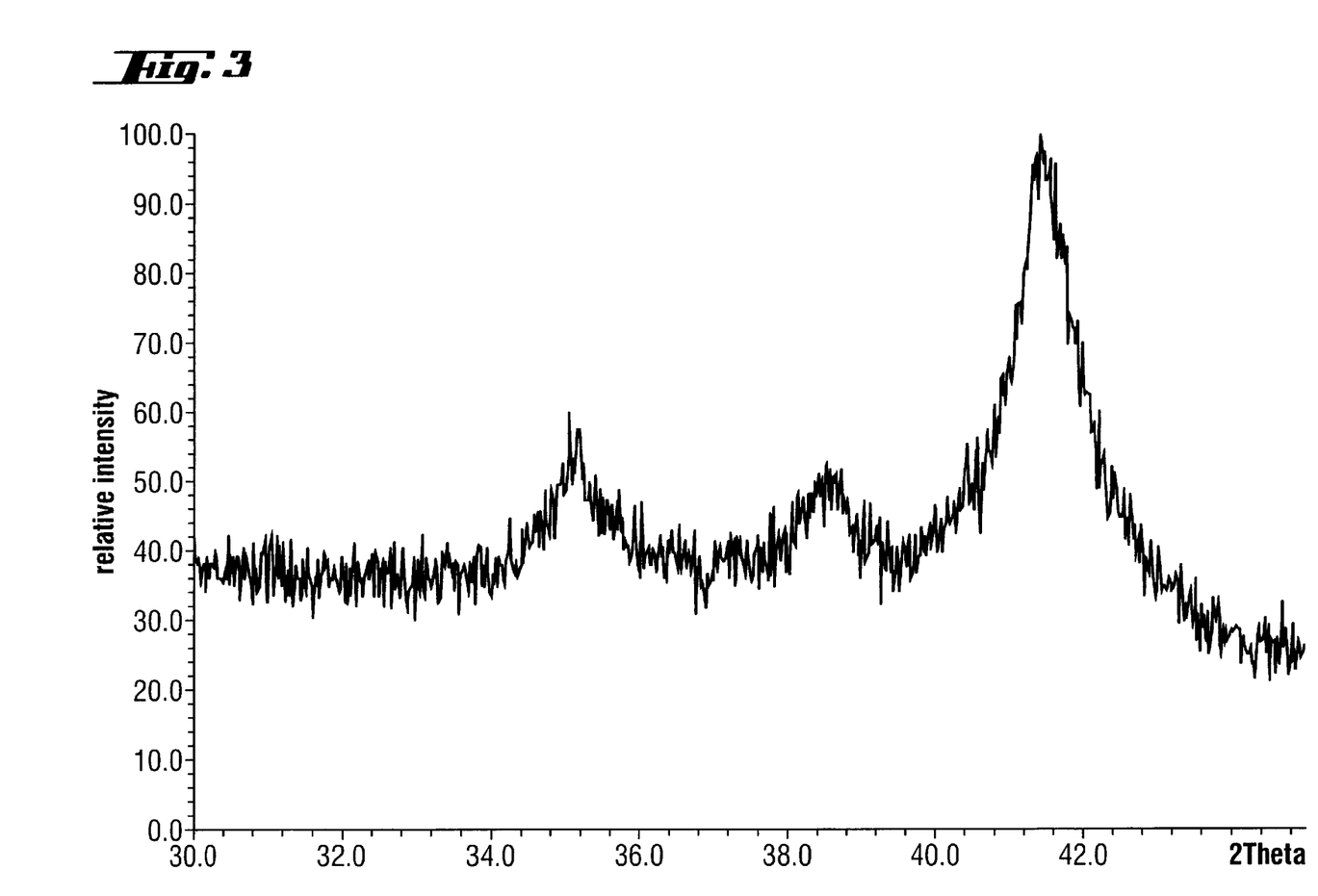
FIG. 3 shows an X-ray diffractogram for particles according to the invention from Example 1.

The XRD spectra for the particles from Examples 1 to 4 show a clear signal at around 2theta=41.5°. This corresponds to the signal lines for magnetite ($Fe_3O_4$) and maghemite (gamma-$Fe_2O_3$). In the particles from Examples 1 and 3 the weak signal at 2theta=38.5° indicates proportions of haematite (alpha-$Fe_2O_3$). The background noise in the signals in Examples 1 to 3 is caused by the amorphous silicon dioxide, that in Example 4 by the amorphous cerium oxide. The XRD spectrum for Example 4 additionally shows two signals at 2theta=38.5° and 33.2°, which correspond to those for crystalline cerium(IV) oxide. FIG. 3 shows the X-ray diffractogram for the particles from Example 1.

Estimation according to Debye-Scherrer gives an average maghemite crystallite size for the particles from Example 1 of 10.8 nm, from Example 2 of 11.2 nm, from Example 3 of 11.5 nm and from Example 4 of 15.1 nm.

Blocking Temperature

Figure 4:
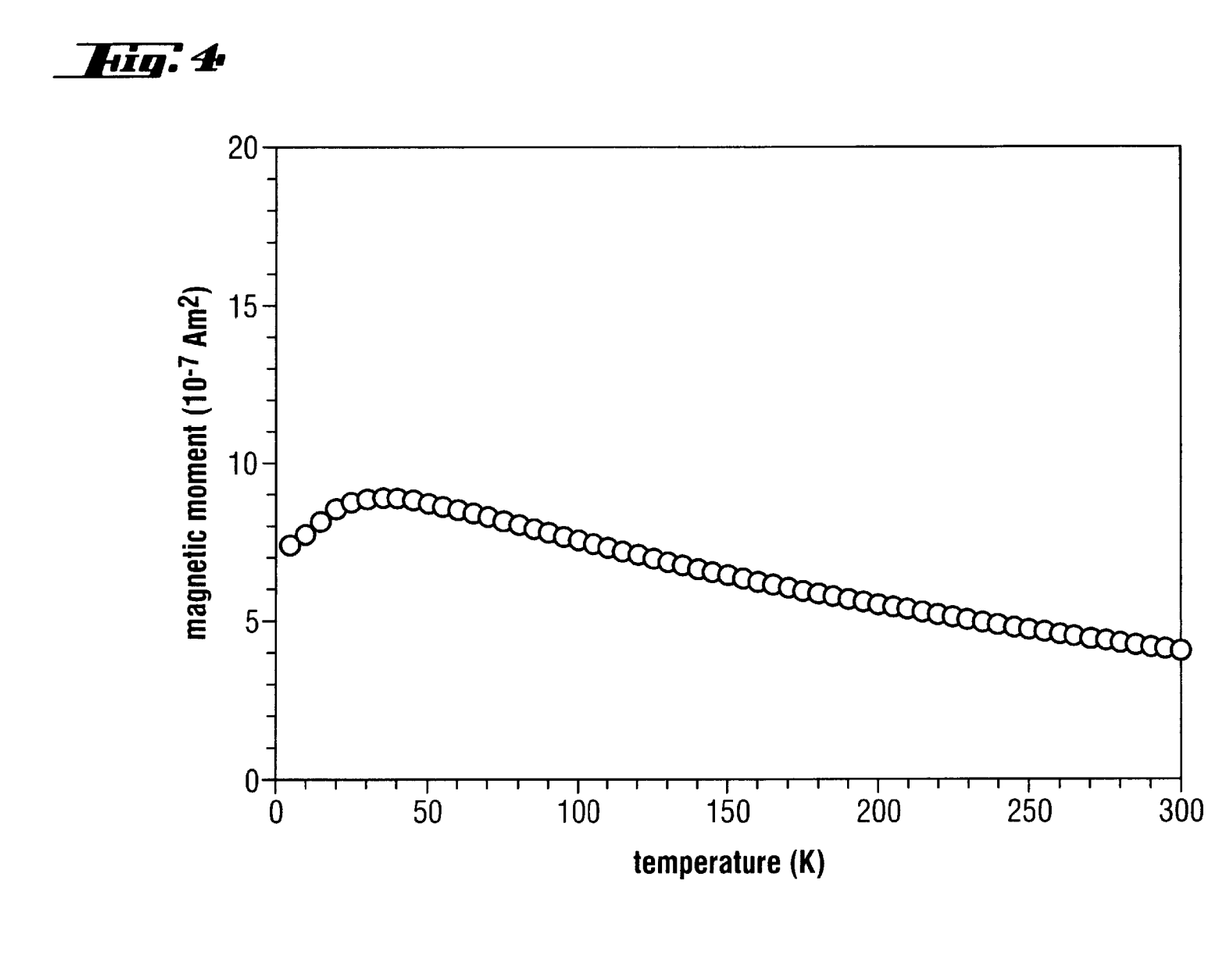
FIG. 4 shows the variation of magnetic moment with temperature on cooling in zero magnetic field for particles according to the invention from Example 2.

The maximum on the "zero field cooled" curve corresponds to the blocking temperature of the composite material. The blocking temperature is described as the temperature at which superparamagnetism occurs. Above this temperature the magnetisation curve displays no hysteresis. The temperature is sufficient to cancel out the orientation of the magnetic domains due to entropy effects on removal of the external magnetic field. FIG. 4 shows the "zero field cooled" curve for particles from Example 2.

The blocking temperatures $T_B$ are around 100 K for the particles from Example 1, around 40 K for those from Example 2, and around 120 K for those from Example 3.

Magnetization

Figure 5:
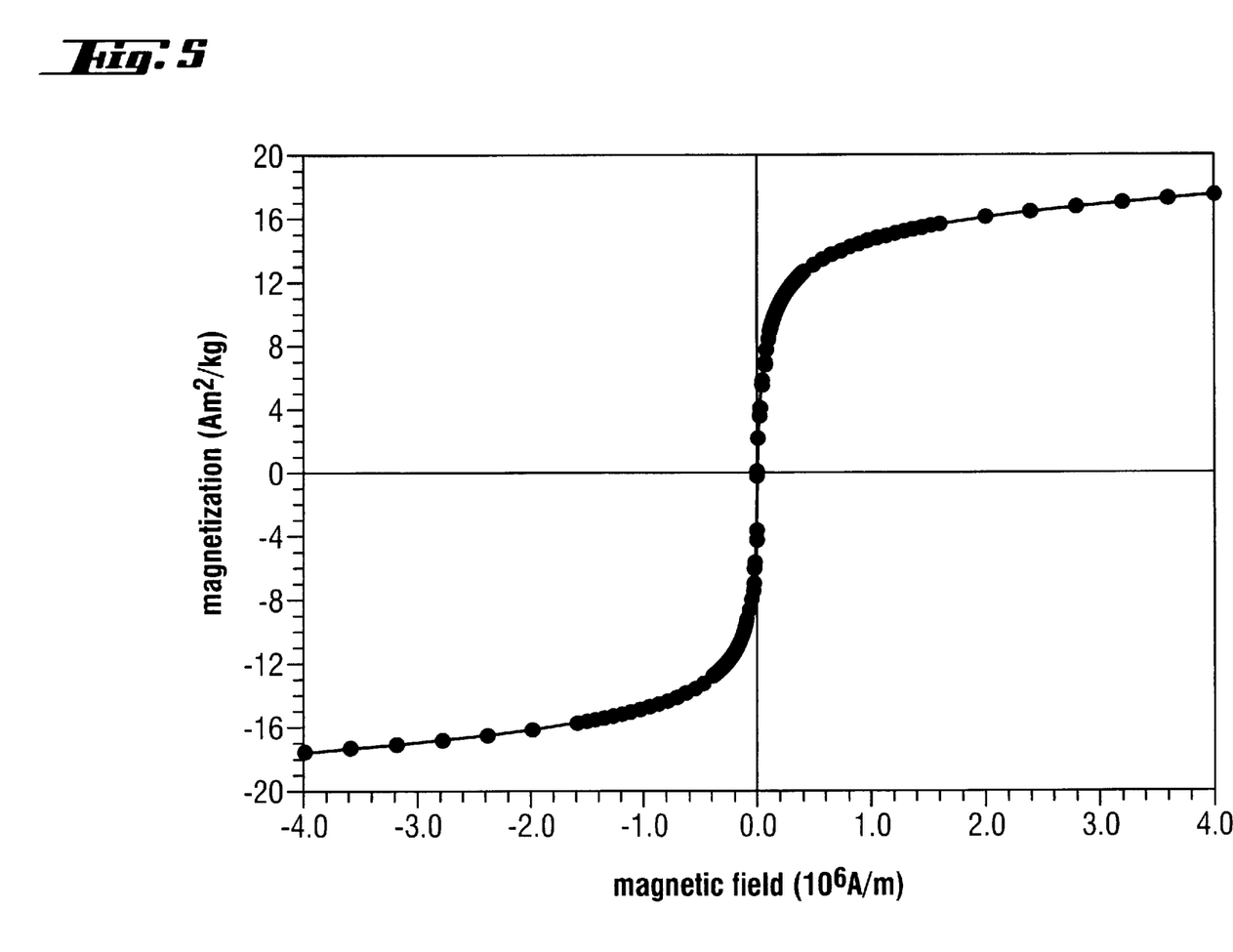
FIG. 5 shows the magnetisation curve for particles according to the invention from Example 1.

The superparamagnetic behaviour can be deduced from the magnetization curve, which for Examples 1 to 4 displays no hysteresis. FIG. 5 shows the magnetization curve for the particles from Example 1.

Saturation magnetization is the maximum magnetic moment that can be achieved per unit volume. Saturation magnetization is reached in infinitely large magnetic fields. The magnetization established by an external field of B=5 T roughly corresponds to the saturation magnetisation and is used as a measure for magnetizability.

The saturation magnetization according to the magnetization curves for the particles from Example 1 is 17 $Am^2/kg$, from Example 2 6.5 $Am^2/kg$, from Example 3 10.4 $Am^2/kg$ and from Example 4 12.5 $AM^2/kg$.

The disclosure of the priority document Application No. 101 40 089.6, filed in Germany on Aug. 16, 2001, is incorporated by reference herein in its entirety.

What is claimed is:

1. Pyrogenic, oxidic particles containing superparamagnetic metal oxide domains in a non-magnetic matrix comprising a metal oxide or a metalloid oxide, where each of the domains has a diameter of from 3 to 20 nm and where the chloride content of the particles is in a range from 50 to 1000 ppm.

2. The particles according to claim 1, further comprising carbon, wherein the carbon content of the particles is below 500 ppm.

3. The particles according to claim 1, wherein a BET surface area of the particles is from 10 to 600 $m^2/g$.

4. The particles according to claim 1, wherein a blocking temperature of the particles is no higher than 150 K.

5. The particles according to claim 1, wherein the superparamagnetic metal oxide domains constitute from 1 to 99.6 wt. % of the particles.

6. The particles according to claim 1, wherein the superparamagnetic metal oxide domains comprise an oxide of Fe, an oxide of Cr, an oxide of Eu, an oxide of Y, an oxide of Sm, or an oxide of Gd.

7. The particles according to claim 6, wherein the oxide of Fe is selected from the group consisting of $\gamma$-$Fe_2O_3$, $Fe_3O_4$, mixtures of $\gamma$-$Fe_2O_3$ and $Fe_3O_4$, and mixtures of at least one non-magnetic compound containing iron and one or more of $\gamma$-$Fe_2O_3$ and $Fe_3O_4$.

8. The particles according to claim 1, wherein the matrix comprises an oxide of an element selected from the group consisting of Si, Al, Ti, Ce, Mg, Zn, B, Zr and Ge.

9. The particles according to claim 1, further comprising an inorganic or organic reagent adsorbed on the particles.

10. The particles according to claim 1, further comprising an inorganic or organic reagent surface reacted or complexed with the particles.

11. A process for producing pyrogenic, oxidic particles, the process comprising:
    mixing
        a first compound containing a first metal or metalloid component, said first compound being a precursor of the non-magnetic matrix,
        a second compound containing a second metal component, said second compound being a precursor of the superparamagnetic domains,
        air and/or oxygen, and
        a fuel gas, where
            at least one of the first compound and the second compound contains chlorine;

reacting the mixture in a flame to form a solid product; and producing the particles of claim 1.

12. The process according to claim 11, wherein the mixing comprises evaporating, together or separately, the first compound and the second compound.

13. The process according to claim 12, wherein the mixing further comprises using a carrier gas to feed the evaporated first compound and the evaporated second compound into a mixing zone; and introducing the air or oxygen, and the fuel gas, into the mixing zone.

14. The process according to claim 11, wherein the mixing comprises preparing an aerosol from an aqueous solution or salt suspension of the second compound; and introducing the aerosol into a gas mixture containing the first compound.

15. The process according to claim 14, wherein at least one of the aerosol and the gas mixture contains chlorine.

16. The process according to claim 11, wherein the mixing comprises preparing, together or separately, a first aerosol containing an aqueous solution or salt suspension of the first compound and a second aerosol containing an aqueous solution or salt suspension of the second compound.

17. The process according to claim 16, wherein at least one of the first aerosol and the second aerosol contains chlorine.

18. The process according to claim 11, further comprising purifying the solid product by heat treatment with gases humidified with water vapor.

19. A method of using pyrogenic, oxidic particles, the method comprising adding the particles of claim 1 to a ferro fluid.

20. A method of using pyrogenic, oxidic particles, the method comprising polishing glass or metal surfaces with the particles of claim 1.

* * * * *